(12) United States Patent
Kurashima et al.

(10) Patent No.: US 7,057,011 B2
(45) Date of Patent: Jun. 6, 2006

(54) CONTINUOUS RESIN RECOVERY APPARATUS AND RECOVERY METHOD

(75) Inventors: Kazuyoshi Kurashima, Yokohama (JP); Yoshiteru Sumi, Ichihara (JP); Yasuo Etoh, Chiyoda-ku (JP); Kumiko Minezaki, Yokohama (JP); Daisuke Ninomiya, Yokohama (JP)

(73) Assignee: Asahi Glass Company, Limited, Tokyo (JP)

(*) Notice: Subject to any disclaimer, the term of this patent is extended or adjusted under 35 U.S.C. 154(b) by 0 days.

(21) Appl. No.: 11/039,919

(22) Filed: Jan. 24, 2005

(65) Prior Publication Data

US 2005/0197487 A1    Sep. 8, 2005

Related U.S. Application Data

(63) Continuation of application No. PCT/JP03/09336, filed on Jul. 23, 2003.

(30) Foreign Application Priority Data

Jul. 24, 2002 (JP) .............................. 2002-215340

(51) Int. Cl.
*C08F 6/00*    (2006.01)
(52) U.S. Cl. ........................ 528/480; 422/131; 526/67; 528/428; 528/502
(58) Field of Classification Search ............... 422/131; 526/67; 528/428, 502
See application file for complete search history.

(56) References Cited

U.S. PATENT DOCUMENTS 6,150,498 A * 11/2000 Abel et al. .................. 528/388

FOREIGN PATENT DOCUMENTS

| JP | 55-15645 | 2/1980 |
|----|----------|--------|
| JP | 6-32821 | 2/1994 |
| JP | 2002-119811 | 4/2002 |
| JP | 2003-137922 | 5/2003 |
| WO | WO 03/004550 A1 | 1/2003 |

* cited by examiner

*Primary Examiner*—Terressa Boykin
(74) *Attorney, Agent, or Firm*—Oblon, Spivak, McClelland, Maier & Neustadt, P.C.

(57) ABSTRACT

The present invention provides a continuous resin recovery method for recovering resin from which foreign matters and volatile components are sufficiently removed and which is highly purified and suitable for optical use. The continuous resin recovery method comprises heating a resin solution in a heating pipe at a temperature at least the boiling point of the solvent, introducing the resin solution heated at a temperature at least the boiling point of the solvent into a rough drying chamber maintained at a reduced pressure, separating the resin from the solvent vapor in the rough drying chamber, melting the separated resin, introducing the molten resin in a precise drying chamber kept at a reduced pressure, and passing the molten resin through a perforated plate in the precise drying chamber.

8 Claims, 1 Drawing Sheet

CONTINUOUS RESIN RECOVERY APPARATUS AND RECOVERY METHOD

TECHNICAL FIELD

The present invention relates to a continuous resin recovery apparatus and a recovery method in which a resin solution is dried to remove sufficiently volatile contents. More specifically, the present invention relates to a continuous resin recovery apparatus and a recovery method for recovering resin suitable for optical use from which foreign matters and volatile contents are sufficiently removed and which is highly purified.

BACKGROUND ART

Purification process of resin usable for semiconductor use or optical use is required to remove foreign matters and volatile contents as much as possible to obtain a highly purified resin. In particular, in a case of resin for plastic optical fibers, it is required to reduce scattering and absorption which prevent propagation of light, to an extremely low level.

In order to remove foreign matters from the resin, filtering is the most suitable method. Here, a method of precisely filtering a raw material of resin such as a monomer and polymerizing the raw material to produce an optical resin, has been known. However, there is a wide demand for using resin produced by various methods, for optical use, and it is necessary to remove foreign matters from the resin produced. In order to directly filter resin, it is necessary to filter molten resin. Therefore, a high temperature filtering device durable under high temperatures is required. In the existing techniques, there is no known method to obtain an optically satisfying resin by directly filtering a molten resin. If the resin can be dissolved by a solvent into a solution, foreign matters can be removed by filtering the solution. When the resin solution is filtered, the foreign matters can be removed sufficiently by a known filtering method. However, in a case of the resin for optical use, volatile contents also need to be removed at the same time. This is because the volatile contents cause bubbling at the time of a heat process to the optical resin, or the solvent absorbs light. Various methods for recovering the resin from a resin solution have been proposed. For example, JP-A-8-11835 proposes a method of removing volatile contents after forming a thin layer of resin solution by rotating vanes. JP-A-2000-102921 proposes a method of drying a molten resin by employing a perforated plate. Further, Hosokawa Micron Corporation provides a method having a tradename of "CRUX System". This resin recovery method is a method of heating a resin solution to a temperature at least the boiling point of the solvent by employing a heating pipe, to evaporate the solvent and further heating the evaporated solvent to form a high speed jet flow of the superheated vapor of solvent, whereby the vapor of solvent and resin content are separated without causing choking of the heating pipe. Further, as a flow control method for highly purified molten resin by which little foreign matters is interfused, JP-A-2001-38725 proposes a control method of changing the temperature to control a flow state of molten resin.

Among the above conventional methods for recovering resin from a resin solution, the method described in JP-A-8-11835 employs an apparatus having a sliding part bearing high speed rotation. However, it was unavoidable to generate dust from the sliding part. Further, in the method described in JP-A-2000-102921 a resin solution of low concentration could not be directly treated on the basis that drying method is for a high viscosity fluid. Namely, the resin solution of low concentration and low viscosity, from which foreign matters should be sufficiently removed by filtering, could not be treated. Further, in the above "CRUX System", there have been problems in that the method can not reduce the amount of residual solvent to a level required for the optical resin, and in that prevention of contamination is difficult because the resin obtained contains bubbles and foreign matters tend to be involved in the resin when the resin is taken out of the apparatus.

Thus, heretofore, there has not been known any recovery apparatus or recovery method for resin in which foreign matters and volatile contents are removed sufficiently from the resin and interfusion of foreign matters can be prevented and for permitting continuous process. The present invention is to solve the above-mentioned problems and to provide a recovery apparatus and a recovery method for resin suitable for optical resin. Specifically, the present invention has been achieved by finding that contamination resistance can be improved by combining a specific rough drying step and a specific precise drying step and by adding a specific method for controlling the flow of resin in a molten state, and further, by combining the entirety in an organic system.

DISCLOSURE OF THE INVENTION

The present invention provides a continuous resin recovery apparatus for continuously drying a resin solution and recovering resin from which a solvent is removed, the continuous resin recovery apparatus being characterized by comprising a liquid-feeding means for feeding the resin solution, a heating pipe for heating the resin solution, a rough drying chamber that is depressurized and in which the heated resin solution is introduced, and a precise drying chamber that is depressurized and is located underneath the rough drying chamber so that the molten resin roughly dried can flow down to be introduced in the precise drying chamber, wherein a perforated plate through which the molten resin flows is horizontally provided in the precise drying chamber. According to the recovery apparatus for resin, the resin from which volatile contents are removed sufficiently can be recovered at high productivity.

Here, it is preferred that a filtering device is provided between the liquid-feeding means and the heating pipe. According to this embodiment, a high degree of removal of foreign matters becomes possible by a single resin recovery apparatus. Further, it is preferred that no sliding part for bearing a high speed rotational member (as discussed regarding JP-A-2000-102921) other than the liquid-feeding means is provided in a portion which is in contact with the resin solution or the molten resin. Since the recovery apparatus has no sliding part other than the liquid-feeding means, generation of dust from the sliding part is negligible and interfusion of foreign matters into the purified resin can be prevented preferably.

Further, the present invention provides a continuous resin recovery method for continuously recovering resin by employing the above-mentioned continuous resin recovery apparatus, the continuous recovery method being characterized by heating a resin solution in a heating pipe at a temperature at least the boiling point of the solvent, introducing the resin solution heated at a temperature at least the boiling point of the solvent into a rough drying chamber which is kept at a reduced pressure, separating the resin from the solvent vapor in the rough drying chamber, melting the separated resin, introducing the molten resin into the precise drying chamber which is kept at a reduced pressure, and passing the molten resin through a perforated plate in the precise drying chamber. According to this method, the resin from which volatile components are removed sufficiently can be recovered at high productivity. Here, it is preferred that the resin solution is introduced into the heating pipe after the solution is filtered. According to this embodiment, the resin from which foreign matters as well as volatile components is removed sufficiently at the same time, can be recovered at high productivity.

Further, it is preferred that at the time of recovering the molten resin from a lower part of the precise drying chamber, the heating the resin to make it in a molten state so that the resin can flow, and the cooling the resin to be in a solid state to stop the flow, are performed alternately. According to this embodiment, in taking out the resin, from which volatile components and foreign matters are sufficiently removed, to the outside of the apparatus, the resin does not contact any sliding parts such as an outlet valve and an infusion of foreign matters into the resin can be prevented.

Further, the resin is preferably resin for optical use, in particular the resin is preferably a fluorine-containing type transparent resin. The resin recovery method of the present invention is suitable for recovering resin for optical use from which foreign matters and volatile components need to be removed sufficiently and which needs to be highly purified.

EXPLANATION OF NUMERALS

Figure 1:
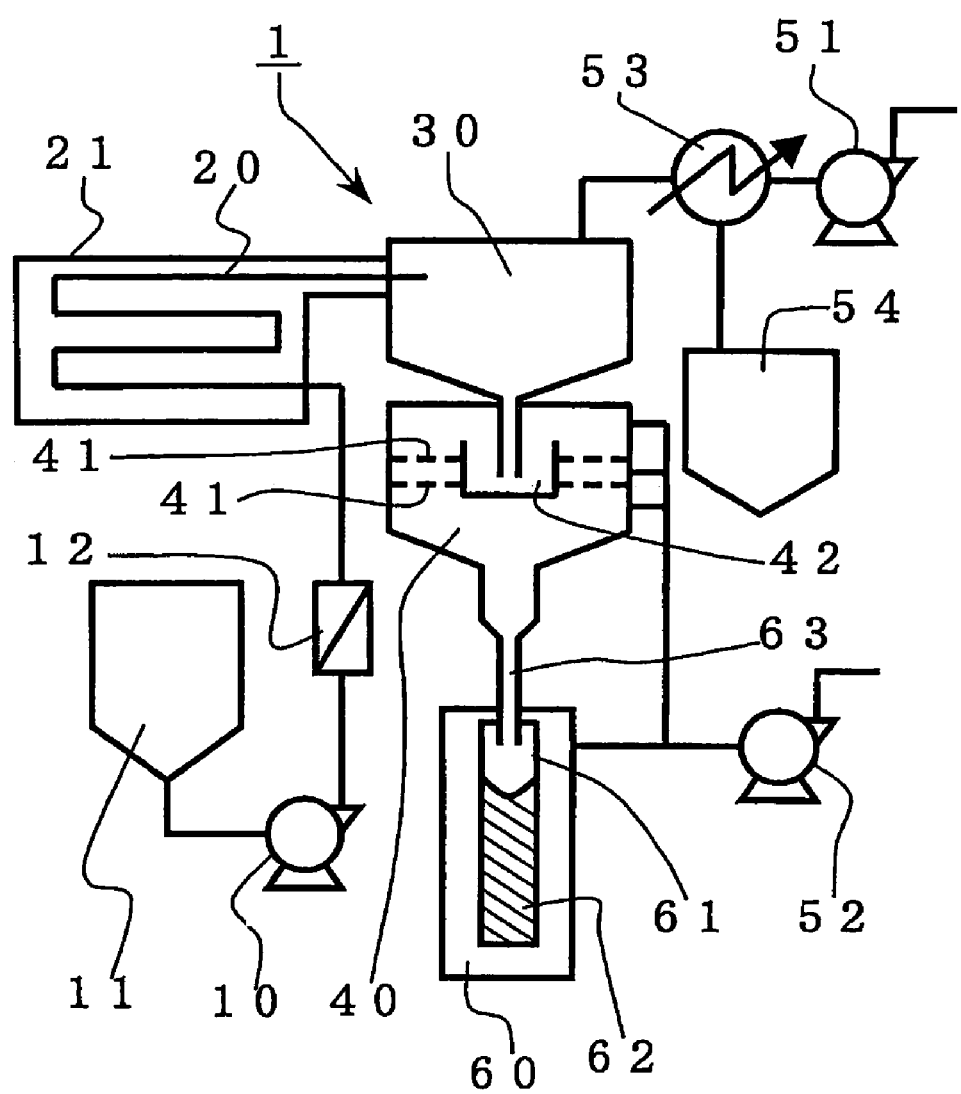
FIG. 1 is a schematic systematic view showing an example of the continuous resin recovery apparatus of the present invention.

Disclosed in FIG. 1 is a resin recovery apparatus 1, a liquid-feeding pump 10, a raw liquid tank 11, a filtering device 12, a heating pipe 20, a heating bath 21, a rough drying chamber 30, a precise drying chamber 40, a perforated plate 41, a distributor 42, a first vacuum pump 51, a second vacuum pump 52, a heat exchanger 53, a solvent tank 54, a resin recovery unit 60, a resin recovery vessel 61, a resin 62, and a resin recovery passage 62.

BEST MODE FOR CARRYING OUT THE INVENTION

First, an example of the continuous resin recovery apparatus of the present invention will be described employing the drawing. FIG. 1 is a schematic systematic view showing an example of the continuous resin recovery apparatus of the present invention. The resin recovery apparatus 1 comprises a liquid-feeding pump 10 as a liquid-feeding means, a heating pipe 20, a rough drying chamber 30 and a precise drying chamber 40. To the rough drying chamber 30, a first vacuum pump 51 as means for depressuring is connected, and to the precise drying chamber 40, a second vacuum pump 52 as means for depressuring is connected. Further, two perforated plates 41 are horizontally provided in the precise drying chamber 40. A raw liquid tank 11 is provided at the other side of the heating pipe 20 with respect to the liquid-feeding pump 10, namely, at the upstream side of the liquid-feeding pump 10, and a filtering device 12 is provided between the liquid-feeding pump 10 and the heating pipe 20, namely, at the downstream side of the liquid-feeding pump 10. The heating pipe 20 is provided in the heating bath 21.

A heat exchanger 53 is provided between the rough drying chamber 30 and the first vacuum pump 51, and a solvent tank 54 is provided underneath the heat exchanger 53. Further, underneath the precise drying chamber 40, a resin recovery unit 60 is provided. The precise drying chamber 40 and the resin recovery unit 60 are connected with a resin recovery passage 63. A resin recovery vessel 61 is attached in the resin recovery unit 60, to recover a purified resin 62. Here, there is no sliding part such as a valve is present in a portion which is in contact with a resin solution or a molten resin after it is passed through the liquid-feeding pump 10.

The liquid-feeding pump 10 as liquid-feeding means is preferably a constant-quantity liquid-feeding pump such as a plunger pump or a diaphragm pump, particularly preferably a diaphragm pump since it has less sliding portions. Liquid-feeding is possible by pressurizing the raw liquid tank 11 by an inert gas. However, such method is not preferred since flow-rate control tends to be unstable. The material for the diaphragm of the diaphragm pump is not particularly limited so long as it has corrosion resistance against resin solvents. Another example of the material may be a resin such as a polytetrafluoroethylene resin or a corrosion-resistant steel such as a stainless steel. Pump capacity can be appropriately selected depending on the liquid-feeding speed of the resin solution.

In the raw liquid tank 11, a resin solution as the raw material is reserved. The raw liquid tank 11 preferably has an air-tight structure capable of being purged with an inert gas. The raw liquid tank 11 is preferably disposed on a load cell so that the weight of the content can be measured. Further, the raw liquid tank 11 is preferably provided with heating means such as an electric heater. Here, the heating of the resin solution is preferably performed at a temperature of at most the boiling point of the solvent. The heating of the resin solution is preferred for such reasons that when the viscosity of the resin solution decreases, filtering becomes easy, the viscosity of the resin solution is maintained to be constant, and control in the subsequent heating in the heating pipe becomes easy.

In the filtering device 12, the resin solution is filtered. Foreign matter generated by the liquid-feeding pump 10 can also be removed by providing the filtering device 12 on the downstream side of the liquid-feeding pump 10. The size of the foreign matter removed by the filtering device is determined by the mesh size of the filtering device. The smaller the mesh size is, the smaller foreign matters can be removed. However, it may cause a pressure loss for liquid-feeding. The problem of increasing the pressure loss can be solved by employing a filtering device having a large filtering area. Here, the mesh size means a value of mesh size by which at least 99% of particles having a particle size larger than the mesh size value can be captured, which is measured in accordance with the measurement method complying with SEMATEC standard (SEMASPEC 92010949B). The mesh size is preferably at most 0.5 µm, more preferably at most 0.2 µm, particularly preferably from 0.01 to 0.1 µm. The material of the filtering surface (filtering media) may, for example, be a polytetrafluoroethylene resin, a polyethylene resin, a polypropylene resin, a nylon resin or a polyethersulfone resin. Among these, a polytetrafluoroethylene resin, a polyethylene resin or a polypropylene resin is preferred.

The heating pipe 20 is provided at the downstream side of the liquid-feeding pump 10 and the filtering device 12. Further, an open end of the heating pipe 20 is in the rough drying chamber 30. The length and the inner diameter of the heating pipe 20 are determined depending mainly on the property of the solvent of the resin solution. It is preferred that the heating pipe 20 can be heated by a heating medium. Here, the structure for heating the heating pipe 20 may be a structure wherein the heating pipe 20 is a double-walled pipe so as to pass a heating medium between the walls of the double-walled pipe, or a structure that the heating pipe 20 is accommodated in a heating bath 21 filled with a heating medium as shown in FIG. 1. From the reason that the structure is simple and a high heat efficiency can be easily obtained, the structure having the heating pipe 20 accommodated in the heating bath 21 filled with a heating medium is preferred. Further, the heating medium may, for example, be a heating medium oil or steam. Among these, steam is preferred since it has a large thermal capacity and a high thermal efficiency.

The rough drying chamber 30 accommodates therein an open end of the heating pipe 20 and is connected with a pipe connecting the first vacuum pump 51 through the heat exchanger 53. Further, a precise drying chamber 40 is provided underneath the rough drying chamber 30, and a lower opening of the rough drying chamber 30 is provided inside the precise drying chamber 40. In the rough drying chamber 30, a heating means (not shown in FIG. 1) such as an electric heater for melting the resin is provided. The volumetric capacity of the rough drying chamber 30 is appropriately determined considering e.g. treatment speed of the resin solution. Further, lower part of the rough drying chamber 30 preferably has a cone shape so that molten resin can flow down.

The first vacuum pump 51 is preferably a vacuum pump such as an oil rotary vacuum pump or a dry vacuum pump. The evacuation capacity is appropriately determined considering the treatment speed of the resin solution. The heat exchanger 53 is provided between the first vacuum pump 51 and the rough drying chamber 30. The type of the heat exchanger 53 may be any type, and preferably a type having a structure unlikely to be resistance to the evacuation. The heat exchanging capacity of the heat exchanger 53 is appropriately determined depending on the treatment speed of the resin solution. And a capacity for sufficiently condensing the solvent vapor evaporated from the resin solution, is required. A coolant is employed for cooling the heat exchanger 53. The coolant is appropriately determined depending on e.g. treatment speed of the solvent vapor. Here, in order to improve the recovery rate of the solvent, the controlled temperature of the coolant is preferably at least 50° C. lower than the boiling point of the solvent, more preferably at least 70° C. lower than that, particularly preferably at least 90° C. lower than that. A plurality of the heat exchangers 53 may be arranged in parallel. A solvent tank 54 is provided underneath the heat exchanger 53. The capacity of the solvent tank 54 is appropriately determined depending on the treatment speed of the resin solvent. For convenience in discharging the recovered solvent from the apparatus, a valve is preferably provided between the solvent tank 54 and the heat exchanger 53. The solvent tank 54 is preferably cooled and reserved at a temperature equivalent to or lower than the temperature of the heat exchanger 53.

The precise drying chamber 40 is provided underneath the rough drying chamber 30 so that the molten resin roughly dried flows down and is introduced into the precise drying chamber 40. In the precise drying chamber 40, the lower opening of the rough drying chamber 30 is provided. Further, the precise drying chamber 40 is connected with a pipe which connects the second vacuum pump 52. The second vacuum pump 52 is preferably a vacuum pump such as an oil rotary vacuum pump or a dry vacuum pump. The evacuation capacity is appropriately determined depending on treatment speed of the resin solution, and may be smaller than the evacuation capacity of the first vacuum pump 51. However, the vacuum degree (ultimate pressure) is preferably higher than that of the first vacuum pump 51. Namely, the second vacuum pump 52 is preferably a vacuum pump capable of obtaining higher degree of vacuum. The ultimate pressure degree is preferably at most 0.1 kPa. The second vacuum pump 52 is preferably provided with a cooling trap for protection of the vacuum pump and for preventing dust generated from the vacuum pump from inversely flowing back to the apparatus.

In the precise drying chamber 40, perforated plates 41 are horizontally provided. The number of the perforated plates 41 is not limited and preferably from 2 to 6 perforated plates 41 are provided. The perforated plates 41 are provided so that a molten resin can flow through. Namely, the perforated plates 41 are preferably provided over all the area in which the molten resin can flow through. In the precise drying chamber 40, a distributor 42 is preferably provided to distribute through the perforated plates 41 the molten resin flowing down from the lower opening of the rough drying chamber 30. The distributor 42 does not require a special structure and may be a dish type vessel having a certain depth. The distributor 42 is supported by e.g. a pole in the precise drying chamber 40. The precise drying chamber 40 is provided with heating means (not shown in FIG. 1) such as an electric heater for keeping the molten resin hot. Further, the same type of heating means is preferably provided also in the distributor 42. The volumetric capacity of the precise drying chamber 40 is appropriately determined considering e.g. the treatment speed of the resin solution. The lower part of the precise drying chamber 40 preferably has a cone shape so that the molten resin can flow down.

A resin recovery unit 60 is provided underneath the precise drying chamber 40. The lower part of the precise drying chamber 40 is connected to a resin recovery passage 63 which is further connected to the resin recovery unit 60. A resin recovery vessel 61 is provided in the resin recovery unit 60, for recovering a purified resin 62. The resin recovery passage 63 is preferably a single pipe whose outside is provided with a temperature control means capable of heating and cooling. The temperature control means is preferably e.g. a removable electric heater. Cooling can be performed by air blowing or air cooling after removing the e.g. the electric heater. The resin recovery unit 60 has a heat-retention means. The heat-retention means prevents the molten resin from being cooled while it fills the resin recovery vessel 61, whereby insufficient filling can be prevented. The bottom of the resin recovery unit is preferably provided with a load cell with a reflection plate interposed therebetween. The reflection plate is provided for protecting the load cell from heat, which has no guaranteed operation in a high temperature environment.

A part of the resin recovery unit 60 can be opened and closed, whereby the resin 62 recovered can be taken out of the apparatus. The number of resin recovery unit 60 provided underneath the precise drying chamber 40 may be one or at least two. When at least two resin recovery units 60 are provided, the resin recovery passage 63 is preferably branched so as to correspond to the resin recovery units 60. The number of resin recovery vessels 61 provided in the resin recovery unit 60 may be one or at least two in parallel arrangement. When at least two resin recovery vessels 61 are provided in a resin recovery unit 60, the open end of the resin recovery passage 63 (the open end is provided in the resin recovery unit 60) is preferably branched so as to correspond to a resin recovery vessels 61. Further, the resin recovery unit 60 is connected to a vacuum pump. The vacuum pump may be commonly used also as the second vacuum pump 52 for maintaining the precise drying chamber 40 in a depressurized state.

Further, in the continuous resin recovery apparatus of the present invention, it is preferred that no sliding part other than a liquid-feeding pump is provided in a portion which is in contact with a resin solution or a molten resin. Particularly on the downstream side of the filtering device, it is particularly preferred that there is no sliding part in a portion thereof which is in contact with a resin solution or a molten resin. With this construction, generation of dust from the sliding part can be prevented and interfusion of foreign matters into the resin can be prevented. In this apparatus, the chambers are sealed from each other with the resin itself. Specifically, the space between the rough drying chamber 30 and the precise drying chamber 40 and the space between the precise drying chamber 40 and the resin recovery unit 60, are each isolated and sealed from each other with the molten resin. In particular, the space between the rough drying chamber 30 and the precise drying chamber 40 is sealed from each other with the molten resin in the distributor 42.

In the continuous resin recovery apparatus of the present invention, the material of a portion in the apparatus, which may be in contact with the resin solution or the molten resin, is preferably a corrosion-resistant steel such as a stainless steel, a corrosion-resistant metal such as nickel or a corrosion-resistant alloy such as a hastelloy alloy, an Inconel alloy (tradename) or a Monel alloy (tradename). In particular, the material of a portion which may be in contact with the molten resin, is particularly preferably a corrosion-resistant metal such as nickel or a corrosion-resistant alloy such as a hastelloy alloy, an Inconel alloy or a Monel alloy from the viewpoint of corrosion resistance at high temperature. Further, a portion (inner surface) of the apparatus, which may be in contact with the resin solution or the molten resin, is preferably applied with a polishing treatment, particularly preferably applied with a complex electropolishing treatment. The roughness (maximum height Ry according to JIS-B-0601) of the inner surface is preferably at most 0.3 μm. As the roughness of the inner surface is small, generation of dust due to e.g. corrosion can preferably be prevented.

The resin recovery method employing the above-mentioned continuous resin recovery apparatus, will be described using FIG. 1. The resin recovery method of the present invention comprises a step of heating a resin solution at a temperature of at least the boiling point of the solvent in a heating pipe 20, a step of introducing the resin solution heated at a temperature of at least the boiling point of the solvent into a rough drying chamber 30 which is kept at a reduced pressure, a step of separating a resin from the solvent vapor in the rough drying chamber 30, a step of melting the separated resin, a step of introducing the molten resin into the precise drying chamber 40 which is kept at a reduced pressure, and a step of passing the molten resin through a perforated plate 41 in the precise drying chamber 40. Further, in FIG. 1, the resin solution is introduced into the heating pipe 20 after the solution is filtered in the filtering device 12. Further, in the resin recovery method of the present invention, when the molten resin is recovered to the resin recovery unit 60 from the lower part of the precise drying chamber 40, a step of heating the resin to make it in a molten state so that the resin can flow, and a step of cooling the resin to be in a solid state so as to stop the flow are performed alternately. Further, the resin is preferably a resin for optical use.

Here, the resin and the resin solution will be described. The resin recovery method of the present invention is suitable for recovering the resin for optical use because recovery of highly purified resin is possible. Here, applications of the resin for optical use include plastic optical fibers and optical wave guides. Further, the resin may, for example, be a hydrocarbon type transparent resin or a fluorine-containing type transparent resin. A specific example of the hydrocarbon type transparent resin may be polymethyl methacrylate, polystyrene or polycarbonate. Further, a specific example of the fluorine-containing type transparent resin may, for example, be poly(perfluoro(3-oxa-1,6-heptadiene)) or a copolymer of perfluoro(2,2-dimethyl-1,3-dioxol) and tetrafluoroethylene. Among these resins, a fluorine-containing type transparent resin can transmit a wide range of light from visible region to near infrared region with extremely low level of loss since the resin contains no C—H bond or few C—H bonds. Namely, the above fluorine-containing type transparent resin is suitable as a material for plastic optical fibers, and suitable as an object to be purified by the resin recovery method of the present invention.

A solvent for dissolving the resin is appropriately selected from known solvents. As a solvent for dissolving a hydrocarbon type transparent resin may, for example, be acetone or dichloromethane. Further, as a solvent for dissolving a fluorine-containing type transparent resin may, for example, be perfluoro(butyltetrahydrofuran) (boiling point: 97° C.), perfluoro-n-octane (boiling point: 102° C.) or perfluoro-n-hexane (boiling point: 56° C.). These solvents are appropriately selected considering e.g. solubility of the resin, and two or more types of solvents may be mixed for use. It is preferred to select a solvent in which the solubility of resin is high and the solubility of foreign matters is low.

Then, the resin solution in which the resin is dissolved in the solvent will be described. The concentration of the resin in the resin solution is preferably from 0.01 to 25 mass %, more preferably from 1 to 15 mass %. The concentration is decided considering the viscosity of the resin solution. Namely, the viscosity of the resin solution at 20° C. is preferably from 1 to 1,000 mPa·s, more preferably from 1 to 200 mPa·s. If the concentration of the resin is higher than the above range, handling of the solution tends to be difficult since the solution has high viscosity, and filtering tends to be difficult, such being not preferred. If the concentration is lower than the above range, it is not economical, such being not preferred.

In the resin recovery method of the present invention, the resin solution is preferably subjected to an adsorption purification process in advance. Since solid foreign matters can be removed by filtering and non-volatile foreign matters can be removed at the same time in the process of evaporation isolation of the solvent, an adsorption treatment is preferred for removing an unnecessary non-volatile component dissolved in the resin solution. The unnecessary non-volatile component dissolved in the resin solution may, for example, be a colored component resulted from a resin oxidized and denaturated, or a component interfused in the resin in the production process. Each of these components is only a trace in most cases and its specific compound can not be identified by existing analysis methods in most cases. Further, acid components causing corrosion of the apparatus is preferably removed by an adsorption purification. A method for adsorption purification may, for example, be a method of sufficiently dispersing an adsorbent in the resin solution and then removing the adsorbent by filtering, or a method of purifying the resin solution by passing it through a packed tower filled with an adsorbent. The adsorbent is preferably an inorganic type adsorbent insoluble to the solvent. A specific example of the adsorbent may, for example, be an activated carbon, an activated alumina, a silica gel, an acid clay or a synthesized adsorbent. The synthesized adsorbent may, for example, be a synthesized alumina, a synthesized silica alumina or a synthesized alumina magnesia. The condition (temperature and the amount of the adsorbent used) of the adsorption purification is appropriately determined depending on the characteristic of the adsorbent.

The resin solution is preferably subjected to filtering and deoxidation treatments in advance (before the resin solution is put into the raw material tank 11 of FIG. 1). If the filtering is performed, the lifetime of the filtering device provided just before the heating pipe is extended, such being preferred. Further, if the deoxidation treatment is performed, coloring of the resin due to e.g. oxidation of the resin or the solvent at a time of heating, can be prevented.

Now, the resin recovery method of the present invention will be described employing FIG. 1. A resin solution is reserved in a raw material tank 11 at first. The resin solution is preferably subjected to the above-mentioned preliminary purification in advance. The resin solution is kept warm in the raw material tank 11 at a predetermined temperature. The resin solution is transferred by a liquid-feeding pump 10. A filtering device 12 is provided at the downstream side of the liquid-feeding pump 10, and the resin solution is filtered by the filtering device 12. It is preferred that no sliding part is provided in a portion where the resin solution or the molten resin is in contact, at the downstream side of the filtering device 12. Further, it is also preferred that no retention part such as a branching portion of a pipe is provided. The filtering device 12 is preferably provided as close to the heating pipe 20 as possible.

The resin solution is introduced into the heating pipe 20 through the filtering device 12. The length, the diameter and the final length of straight portions are appropriately determined considering the heating temperature and the feeding speed of the resin solution in the heating pipe 20. The heating temperature in the heating pipe 20 is preferably at least 10° C. higher than the boiling point of the solvent of the resin solution, particularly preferably at least 20° C. higher than the boiling point of the solvent. Further, the heating temperature is preferably lower than the decomposition temperature of the resin or that of the solution whichever lower, so that no thermal decomposition of the resin or the solvent occurs. Further, in a case where phase separation of the resin solution takes place at a specific temperature or higher, the heating temperature is preferably lower than the specific temperature i.e. a phase separation temperature. This is for the purpose of preventing the heating pipe 20 from being choked by the phase separation. The heating temperature is preferably from 20 to 50° C. higher than the boiling point of the solvent so long as the temperature satisfies the above conditions. When the resin solution is heated at this temperature, the solvent is evaporated, and is further heated at a temperature of at least the boiling point of the solvent, the superheated solvent vapor thus formed flows through the inside of the heating pipe 20 in a state of jet flow as the solvent vapor is getting separated from the resin component. The resin component is transferred by the solvent vapor in a state of jet flow without adhering to the inside of the heating pipe 20, and is jet out from the open end.

The liquid-feeding speed of the resin solution is determined considering the flowing conditions. At first, the linear speed of the superheated solvent vapor is preferably from 250 to 600 m/s, more preferably from 300 to 400 m/s at the open end of the heating pipe 20. If the above linear speed is lower than 250 m/s, the heating pipe tends to be choked, such being not preferred. If it is higher than 600 m/s, it means that the solvent vapor is considerably superheated, requiring extra cost, such being not preferred. Namely, the liquid-feeding speed of the resin solution is determined so that the speed of the evaporated solvent vapor becomes the above-mentioned speed at the open end of the heating pipe 20. Here, the heating pipe 20 preferably has a final straight portion. The final straight portion means a portion in which a solvent vapor evaporated is superheated and a resin component separated from the solvent vapor is transferred by the high speed solvent vapor. With the straight part, the jet flow of the high speed solvent vapor is stably formed and choking of the heating pipe by the resin component can preferably be prevented.

Further, the length (i.e. the length of a portion subjected to heating) and the inner diameter of the heating pipe 20 is determined, considering the above-mentioned conditions, based on e.g. the specific heat of the solution and the heat transfer coefficient of the heating pipe 20. In order to obtain a large heat transfer area, the ratio between the length and the inner diameter of the heating pipe is preferably at least 5,000 when it is represented by (length)/(inner diameter). These figures are preferably determined in the following steps in an actual design work. First of all, a heating temperature is provisionally determined based on e.g. the boiling points of the resin solution and the solvent and the specific heat. Then, a provisional treatment speed of the resin solution is determined. Under these provisions, the length and the inner diameter of the heating pipe are determined. The length of final linear portion is determined from these figures.

The solvent vapor and the resin component jetted out from the heating pipe 20 are introduced into the rough drying chamber 30. Here, the pressure (the pressure when the solvent vapor is supplied) of the rough drying chamber 30 is preferably at most 5 kPa, more preferably at most 1 kPa, particularly preferably at most 0.5 kPa. If the pressure is higher than 5 kPa, separation and recovery of the solvent vapor do not progress and rough drying of the resin tends to be insufficient, such being not preferred. The temperature of the rough drying chamber 30 is preferably kept to at least 40° C. higher than the glass-transition point of the resin or the heating temperature of the heating pipe 10, whichever higher. Here, the upper limit of the temperature of the rough drying chamber 30 is the decomposition temperature of the resin or that of the solvent whichever lower.

The solvent vapor is exhausted from the rough drying chamber by a first vacuum pump 51, cooled and condensed in a heat exchanger 53 and collected in a solvent tank 54. The resin component is heated in the rough drying chamber 30 to be melted. The melted resin is roughly dried in the rough drying chamber 30 and introduced into a precise drying chamber 40 through the lower part of the rough drying chamber 30. Here, the resin flows downwardly by the gravity.

The resin melted in the rough drying chamber 30 flows downwardly and is introduced into the precise drying chamber 40. The molten resin introduced in the precise drying chamber 40 is diffused by a distributor 42 and passes through a perforated plate 41. Here, the pressure of the precise drying chamber 40 is preferably kept to about from 0.1 to 5 kPa lower than the pressure in the rough drying chamber 30, specifically preferably at most 0.5 kPa, more preferably at most 0.1 kPa. If the pressure in the precise drying chamber 40 is higher than the pressure in the rough drying chamber 30, it is difficult for the molten resin to flow down from the rough drying chamber 30 to the precise drying chamber 40, such being not preferred. The temperature of the precise drying chamber 40 is preferably about from 0.1 to 20° C. higher than the temperature of the rough drying chamber 30. Here, the upper limit of the temperature of the precise drying chamber 40 is at most the decomposition temperature of the resin.

The resin which has flowed down into the precise drying chamber 40 is diffused by the distributor 42, and the distributor 42 also serves as a seal. Namely, the molten resin filing inside of the distributor 42 functions as a material seal and separates environments of the rough drying chamber 30 and the fine drying chamber 40. The molten resin diffused by the distributor 42 passes through the perforated plate 41. When the molten resin passes through the perforated plate 41, the molten resin preferably spreads both in the upper and lower surfaces of the perforated plate 41 thereby sufficiently drying the resin. The molten resin passed through the perforated plate 41 flows down in a form of a plurality of threads, and drying progresses also during the flow down. The molten resin is precisely dried by passing through the perforated plate 41 and residual solvent is reduced to a trace amount. The residual amount of the solvent in the resin after the precise drying is preferably at most 0.05 mass %, more preferably at most 0.01 mass % based on the resin. The molten resin precisely dried is accumulated in a lower portion of the precise drying chamber 40 in a molten state.

The molten resin accumulated in the lower portion of the precise drying chamber 40 flows down to a resin recovery unit 60 through a resin recovery passage 63. The resin flown down fills a resin recovery vessel 61 provided in the resin recovery unit 60. The amount of resin 62 filling the resin recovery vessel 61 may be controlled based on a flow-down time. However, it is preferably subjected to weight control with a load cell provided on the bottom of the resin recovery unit 60.

Here, the resin recovery passage 63 is preferably provided with no valve. This is because a valve has sliding parts which tend to generate dust. A method for controlling the amount of molten resin flown down to the resin recovery unit 60 without providing a valve, may, for example, be the flowing method. At the time of recovering the molten resin in the resin recovery unit 60, the resin is heated to be in a molten state so that it can flow. Specifically, by heating the resin recovery passage 63 by an electric heater, the resin inside the resin recovery passage 63 is melted so that the resin can flow. Further, at the time of stopping the recovery of the molten resin in the resin recovery unit 60, the resin is cooled to be in a solid state so that the flow of the resin is stopped. Specifically, by removing the electric heater for heating the resin recovery passage 63 and by blowing an air by a blower, the resin recovery passage 63 is cooled and the resin inside the resin recovery passage 63 is cooled to be solidified whereby the flow of the resin is stopped. By repeating these heating and cooling steps, the resin recovery vessel 61 filled with refined resin 62 can be taken out from the apparatus at an appropriate time while the purified resin is continuously recovered in the precise drying chamber. The shape and the material of the recovery vessel 61 can be appropriately selected depending on the subsequent process of the resin. The material may, for example, be ceramics, glass, metal or a fluorine resin. The metal in considering thermal resistance and corrosion resistance is preferable. The metal may specifically be the same metal as that is applied for the apparatus body.

By the above-mentioned continuous resin recovery method, highly purified resin can be continuously recovered. Here, evaluation of the purification can be appropriately performed depending on the purpose. Specifically, it can be evaluated by the following methods. Evaluation of residual volatile contents may, for example, be an analysis method by a gas chromatograph method employing a sample heating/evaporating apparatus (head space), an analysis method employing a thermal desorption method in which volatile contents evaporated by heating a sample is once captured by employing a liquid nitrogen and then analyzed. Further, evaluation of interfusion of foreign matters may, for example, be a method of visual observation employing a high intensity light source or a scattered light analysis method in which lateral scattering of a transmitted laser light by foreign matters is measured. The residual volatile contents are preferably at most 0.1 mass %, more preferably at most 0.01 mass % based on a recovered resin.

EXAMPLE

The continuous resin recovery method of the present invention will be described with reference to the following Example. Here, the reference numerals of the apparatus are the same as ones described in the explanation of FIG. 1.

A resin recovery apparatus 1 employed was as follows. A raw liquid tank 11 is a vessel made of a stainless steel having a volumetric capacity of about 70 L. A liquid-feeding pump 10 is a diaphragm pump manufactured by Nikkiso Eiko Co., Ltd. having a maximum liquid-feeding capacity of 0.14 L/min. The material of the diaphragm is a polytetrafluoroethylene resin. A filtering device 12 is a cartridge type filtering device having a mesh size of 0.07 μm and a length of cylindrical part of about 26 cm, and the material of a filtering surface is a polyethylene resin. A heating pipe 20 is a pipe made of a stainless steel having an inner diameter of 4.86 mm, a length of 23.8 m and a length of final straight part of 80 cm.

The drying chamber 30 is a cylindrical vessel made of nickel and having an inner diameter of about 40 cm and an internal volume of about 55 L, the vessel having a cone portion at its lower part. The lower part of the rough drying chamber 30 is a pipe having an inner diameter of 2.8 cm and inserted in a precise drying chamber. The precise drying chamber 40 is a cylindrical vessel made of nickel having an inner diameter of about 21 cm and an internal volume of about 15 L, the chamber having a cone portion at the lower part. A distributor 42 is a tray made of nickel having an inner diameter of 6.5 cm and a height of liquid-contact part of 18 cm. A pipe extending from the lower part of the rough drying chamber 30 is disposed so that its opening was in the distributor 42. In the precise drying chamber 40, four perforated plates 41 are provided in parallel with one another with a spacing of 4.5 cm. Each of the perforated plates 41 is a mesh of 8 mesh made of nickel having a wire diameter of 0.8 mm. The lower part of the precise drying chamber 40 is connected to a resin recovery passage 63.

The resin recovery passage 63 is a pipe made of nickel having an inner diameter at the most slender portion of 1.5 cm. The resin recovery passage 63 is open to the inside of a resin recovery unit 60. The resin recovery unit 60 is a vessel made of stainless steel having an inner diameter of 13.3 cm and a length of about 1 m. In the bottom part in the inside of the resin recovery unit 60, a load cell and four reflective plates made of stainless steel insulating the load cell from the bottom part are provided. A resin recovery vessel 61 is a cylindrical vessel made of nickel having an inner diameter of 33 mm and a length of 47 cm and having a cap portion at the bottom.

A first vacuum pump 51 is an oil rotary type vacuum pump manufactured by Sato Vac Inc. having an evacuation speed of 600 L/min and an ultimate pressure of 0.1 Pa. A second vacuum pump 52 is an oil rotary type vacuum pump manufactured by Shinku Kiko having an evaluation speed of 135 L/min and an ultimate pressure of 0.07 Pa. A heat exchanger 53 is a heat exchanger made of stainless steel having a heat transfer area of about 0.76 m$^2$. A solvent tank 54 is a vessel made of stainless steel having an internal volume of about 66 L.

The raw liquid tank 11, the rough drying chamber 30, the precise drying chamber 40, the distributor 42, the resin recovery passage 63 and the resin recovery unit 60 were all kept warm by electric heaters. Heating of the heating pipe 20 was performed by introducing steam in a heating bath 21. Cooling of the heat exchanger 53 was performed by employing a coolant cooled at 7° C., and cooling of the solvent tank 54 was performed by employing a coolant cooled at –20° C.

The resin solution employed was as follows. Poly(perfluoro(3-oxa-1,6-heptadiene)) as a transparent fluorine resin was employed. The intrinsic viscosity of the resin (measured at 30° C. in perfluoro(butyltetrahydrofuran)) was 0.24. The resin was dissolved in perfluoro(butyltetrahydrofuran) to prepare a resin solution having a resin concentration of 10 mass %. Here, the end of the resin molecule was subjected to a stabilization treatment employing a fluorine gas. The resin solution was subjected to an adsorption refining treatment employing a synthesized alumina magnesia (manufactured by Kyowa Chemical Industry Co., Ltd., tradename: KYOWAAD 2000). After the adsorption treatment, the resin solution was subjected to a filtering treatment through a filtering device having a mesh size of 1 μm, and input in the raw liquid tank 11 in a nitrogen atmosphere.

The resin solution was transferred by the liquid-feeding pump 10 at a flow rate of 10 kg/Hr. The temperature of the heating pipe 20 was set to be 140° C. The setting temperature of the wall surface of the rough drying chamber 30 was set to be 250° C. and the pressure in the rough drying chamber 30 was set to be 5 kPa. Solvent vapor was separated in the rough drying chamber 30, and a roughly dried resin was melted so as to flow down to the precise drying chamber 40. The temperatures of the distributor 42 and the precise drying chamber 40 were set to be 250° C. The pressure in the precise drying chamber 40 was set to be 1 kPa. Molten resin flowing down from lower part of the precise drying chamber 40 was passed through the heated resin recovery passage 63 as the resin was in a molten state, and was recovered in the resin recovery vessel 61 provided inside the resin recovery unit 60. When a predetermined amount was recovered, the resin recovery passage 63 was cooled by air blow to stop the flow of the resin. By these steps, 550 g of the resin was recovered.

When the residual volatile contents of the resin recovered were analyzed by a thermal desorption method, total amount of residual volatile contents was 0.008 mass %. Further, scattered light was measured employing a laser light of 650 nm to evaluate the amount of foreign matters. The measurement was performed by employing a static light-scattering spectrometer (product model: SLS-6000) manufactured by Otsuka Electronics Co., Ltd. Scattered light at an angle of from 20 to 120° was measured and the intensity was analyzed. As a result, the average value of isotropic scattering intensity was $2.5\times10^{-6}$ cm$^{-1}$ and the average value of anisotropic scattering intensity was $4.2\times10^{-7}$ cm$^{-1}$. A graded index type optical fiber was made by employing this resin and its attenuation was measured. As a result, the attenuation was 22 dB/km for a light of 1,300 nm.

INDUSTRIAL APPLICABILITY

As described above, according to the resin recovery apparatus and the resin recovery method of the present invention, the resin from which residual volatile components and foreign matters are removed sufficiently can be continuously recovered. The apparatus and the method are particularly suitable for purifying a resin such as fluorine resin which tends to be electrically charged and tends to be contaminated. Further, the resin obtained by the resin recovery method, can be applied not only for an optical material but also for an electric material requiring high degree of purification since it is highly purified.

The entire disclosure of Japanese Patent Application No. 2002-215340 filed on Jul. 24, 2002 including specification, claims, drawings and summary is incorporated herein by reference in its entirety.

What is claimed is:

1. In a continuous resin recovery apparatus for continuously drying a resin solution and recovering resin from which a solvent is removed, the continuous resin recovery apparatus comprising:
    a liquid-feeding means for feeding the resin solution,
    a heating pipe for heating the resin solution,
    a rough drying chamber that is depressurized and in which the heated resin solution is introduced, and
    a precise drying chamber which is depressurized and is located underneath the rough drying chamber so that the molten resin roughly dried can flow down to be introduced in the precise drying chamber, wherein a perforated plate through which the molten resin flows is horizontally provided in the precise drying chamber and the roughly dried molten resin flows through the perforated plate for precise drying while minimizing residual solvent in the molten resin.

2. The continuous resin recovery apparatus according to claim 1, which further comprises a filtering device positioned between the liquid-feeding means and the heating pipe.

3. The continuous resin recovery apparatus according to claim 1, wherein no sliding part for a rotating member other than the liquid-feeding means is provided in any portion of the recovery apparatus which is in contact with the resin solution or the molten resin.

4. A continuous resin recovery method for continuously recovering resin by employing a continuous resin recovery apparatus, which includes continuously drying a resin solution and recovering resin from which a solvent is removed, the continuous resin recovery apparatus comprising a liquid-feeding means for feeding the resin solution, a heating pipe for heating the resin solution, a rough drying chamber that is depressurized and in which the heated resin solution is introduced and a precise drying chamber which is depressurized and is located underneath the rough drying chamber so that the molten resin roughly dried can flow down to be introduced in the precise drying chamber, wherein a perforated plate through which the molten resin flows is horizontally provided in the precise drying chamber, the continuous recovery method comprising:
    heating a resin solution in the heating pipe at a temperature at least the boiling point of the solvent, introducing the resin solution heated at a temperature at least the boiling point of the solvent into the rough drying chamber which is kept at a reduced pressure, separating the resin from the solvent vapor in the rough drying chamber, melting the resin separated, introducing the molten resin into the precise drying chamber which is kept at a reduced pressure, and passing the molten resin through the perforated plate in the precise drying chamber for precise drying while minimizing the existence of residual solvent in the molten resin.

5. The continuous resin recovery method according to claim 4, which comprises filtering the resin solution before being introduced into the heating pipe.

6. The continuous resin recovery method according to claim 4, which comprises, at the time of recovering the molten resin from a lower part of the precise drying chamber, heating the resin to a molten state so that the resin can flow, and cooling the resin to be in a solid state to stop the flow, such said heating of the resin and cooling of the resin are performed alternately.

7. The continuous resin recovery method according to claim 4, which comprises using the resin for optical use.

8. The continuous resin recovery method according to claim 7, wherein the resin comprises a fluorine-containing transparent resin.

* * * * *